US012686451B2

(12) United States Patent
Janzow et al.

(10) Patent No.: US 12,686,451 B2
(45) Date of Patent: Jul. 21, 2026

(54) NOTCHED SLIDE RAILS FOR SNOWMOBILE DRIVE TRACK SYSTEMS

(71) Applicant: Arctic Cat Inc., Thief River Falls, MN (US)

(72) Inventors: Steven Janzow, Thief River Falls, MN (US); David L. Vigen, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 408 days.

(21) Appl. No.: 18/401,907

(22) Filed: Jan. 2, 2024

(65) Prior Publication Data

US 2024/0375726 A1     Nov. 14, 2024

Related U.S. Application Data

(60) Provisional application No. 63/465,034, filed on May 9, 2023.

(51) Int. Cl.
B62M 27/02     (2006.01)
B62D 55/07     (2006.01)

(52) U.S. Cl.
CPC ....... B62D 55/07 (2013.01); B62M 2027/026 (2013.01); B62M 2027/027 (2013.01)

(58) Field of Classification Search
CPC .................................................... B62D 55/07
See application file for complete search history.

(56) References Cited

U.S. PATENT DOCUMENTS 3,658,145 A     4/1972     Bergmann et al.
3,701,394 A     10/1972     Hendrickson 3,830,323 A     8/1974     Vuolevi
4,518,056 A     5/1985     Kobayashi
4,987,965 A     1/1991     Bourret
5,791,429 A     8/1998     Bergman
(Continued)

FOREIGN PATENT DOCUMENTS

CA          2191008 C     *     1/2005     ........... B62D 55/108

OTHER PUBLICATIONS

Axys Sks Rail Kit (Bomber)—Factory 155; IceAge Manufacturing; https://iceageperformance.com/products/axys-sks-rail-kit-bomber?pr_prod_strat=use_description&pr_rec_id=b99dd5029&pr_rec_pid=6943753961681&pr_ref_pid=6612554776785&pr_seq=uniform; Unknown date.

(Continued)

*Primary Examiner* — Kevin Hurley

(74) *Attorney, Agent, or Firm* — Billion & Armitage

(57)     ABSTRACT

A drive track system for a snowmobile includes a slide rail having a forward section and an aft section. The aft section of the slide rail has a monolithic construction and defines an aftmost wheel station, a second-to-aftmost wheel station forward of the aftmost wheel station and a clearance notch that is at least partially disposed between the aftmost wheel station and the second-to-aftmost wheel station in a longitudinal direction of the slide rail. An aftmost wheel is rotatably coupled to the slide rail at the aftmost wheel station. A second-to-aftmost wheel is rotatably coupled to the slide rail at the second-to-aftmost wheel station. A drive track has a path of travel between the aftmost wheel and the second-to-aftmost wheel such that the drive track and the slide rail form a gap therebetween at the path of travel.

20 Claims, 8 Drawing Sheets

(56) References Cited

U.S. PATENT DOCUMENTS

| | | | |
|---|---|---|---|
| 6,161,908 | A | 12/2000 | Takayama et al. |
| 6,234,264 | B1 | 5/2001 | Boivin et al. |
| 6,962,222 | B2 | 11/2005 | Kirihata |
| 7,128,176 | B1 | 10/2006 | Mills et al. |
| 7,493,976 | B2 | 2/2009 | Goldenberg et al. |
| 7,802,645 | B2 | 9/2010 | Mallette et al. |
| 7,918,299 | B2 | 4/2011 | Yoshihara |
| 9,771,130 | B2 | 9/2017 | Beavis |
| 9,902,441 | B2 | 2/2018 | Buchanan et al. |
| 10,065,708 | B2 | 9/2018 | Labbe et al. |
| 10,293,883 | B1 | 5/2019 | Bedard et al. |
| 10,814,935 | B2 | 10/2020 | Vaisanen et al. |
| 11,097,793 | B2 | 8/2021 | Marchildon et al. |
| 11,458,795 | B1 | 10/2022 | Gagnon et al. |
| 11,511,818 | B2 | 11/2022 | Buchanan |
| 11,518,453 | B2 | 12/2022 | Mallette et al. |
| 2005/0023060 | A1 | 2/2005 | Blanchard |
| 2007/0221424 | A1 | 9/2007 | Giese |
| 2009/0085398 | A1 | 4/2009 | Maltais |
| 2016/0200397 | A1 | 7/2016 | Vezina et al. |
| 2016/0280331 | A1 | 9/2016 | Mangum |
| 2018/0273141 | A1 | 9/2018 | Vaisanen et al. |
| 2019/0217906 | A1 | 7/2019 | Lavallee et al. |
| 2020/0016950 | A1 | 1/2020 | Lavallee et al. |
| 2020/0255092 | A1 | 8/2020 | Langaas et al. |
| 2021/0163086 | A1 | 6/2021 | Mallette et al. |
| 2022/0041250 | A1 | 2/2022 | Muron |
| 2023/0013665 | A1 | 1/2023 | Gagnon et al. |

OTHER PUBLICATIONS

Indy XC Snowmobiles; https://www.polaris.com/en-US/snowmobiles/indy/indy-xc/?model=650-indy-xc-129&option=650+Patriot&trim=650-patriot; Unknown date.

Jerry Bassett; Rear Rail Recycling; Snowmobile.com; https://www.snowmobile.com/features/rear-rail-recycling; Jan. 2017.

PLASTIC 8" WHEEL; IceAge Manufacturing; https://iceageperformance.com/products/plastic-8-wheel?pr_prod_strat=copurchase&pr_rec_id=b99dd5029&pr_rec_pid=6600468267217&pr_ref_pid=6612554776785&pr_seq =uniform; Unknown date.

Canadian Office Action; CA Application No. 3,226,087; Canadian Intellectual Property Office; Nov. 25, 2025.

* cited by examiner

10

14a

16

20

18

24

14

22

12

54

48

36

40

46

50

38

48b

56

46a

48a

52

34

NOTCHED SLIDE RAILS FOR SNOWMOBILE DRIVE TRACK SYSTEMS

CROSS-REFERENCE TO RELATED APPLICATIONS

The present application claims the benefit of U.S. Provisional Application No. 63/465,034, filed May 9, 2023, the entire contents of which is hereby incorporated by reference.

TECHNICAL FIELD OF THE DISCLOSURE

The present disclosure relates, in general, to drive track systems for snowmobiles and, in particular, to drive track systems including a slide rail having a monolithic aft end that defines an aftmost wheel station, a second-to-aftmost wheel station and a clearance notch located at least partially between the aftmost and second-to-aftmost wheel stations to provide ground clearance between the ground and the aft end of the drive track system.

BACKGROUND

Snowmobiles travel over snow using front steerable skis and an aft drive track system driven by the snowmobile's powertrain. The drive track system includes a drive track supported by a track frame to provide a large surface area with which to contact snowy surfaces, thereby enhancing traction and propulsion. The track frame typically includes a pair of laterally-spaced slide rails to which idler wheels are rotatably coupled to facilitate movement of the drive track around the track frame. The undersides of the slide rails may be covered with a wear-resistant material and maintain a portion of the drive track against the ground as the drive track slides along the undersides of the slide rails. The drive track system may also include an internal suspension system to absorb vibrations of the slide rails caused by rough ground surfaces, thereby improving ride quality.

The surface area of the drive track system that contacts the ground is determined at least in part by the length of the slide rails, with longer slide rails providing a larger surface area. For off-trail riding, a large ground contact surface area helps to provide floatation and traction for the snowmobile over soft or snowy surfaces. On the other hand, a smaller ground contact surface area facilitates turning, handling and maneuverability on, for example, tight or winding snow trails. Selecting a slide rail length involves a trade-off between these two competing benefits. In order to increase the ground contact surface area of the drive track system, current snowmobiles often utilize flat slide rails that provide no ground clearance at the aft end of the drive track system. Because the slide rails are flat, the drive track is in sliding contact with the aft ends of the slide rails. Snowmobiles using long and flat slide rails fail to reap the aforementioned maneuverability benefits on hard snow or trail surfaces. In addition, when the snowmobile is driven in reverse, particularly on soft snow, the lack of ground clearance at the aft ends of such drive track systems can cause the drive track to dig into the snow, which may result in the snowmobile becoming immobilized. Other types of snowmobiles utilize slide rails coupled to articulating, or pivotable, aft arms to vary the downward force exerted on the drive track at the aft end of the drive track system. Such articulating systems, however, are complex and require numerous additional moving components, making such systems more costly, unreliable and difficult to manufacture. Accordingly, a need has arisen for cost-effective and reliable slide rails with the floatation and traction benefits of long slide rails and the maneuverability benefits of short slide rails.

SUMMARY

In a first aspect, the present disclosure is directed to a drive track system for a snowmobile. The drive track system includes a slide rail having a forward section and an aft section. The aft section of the slide rail has a monolithic construction and defines an aftmost wheel station, a second-to-aftmost wheel station forward of the aftmost wheel station and a clearance notch at least partially disposed between the aftmost wheel station and the second-to-aftmost wheel station in a longitudinal direction of the slide rail. An aftmost wheel is rotatably coupled to the slide rail at the aftmost wheel station. A second-to-aftmost wheel is rotatably coupled to the slide rail at the second-to-aftmost wheel station. A drive track has a path of travel between the aftmost wheel and the second-to-aftmost wheel such that the drive track and the slide rail form a gap therebetween at the path of travel.

In some embodiments, the slide rail may include upper and lower ribs, the upper rib extending longitudinally through the forward and aft sections of the slide rail and defining at least a portion of the clearance notch having a flat profile. In such embodiments, the lower rib may extend from a forward end of the clearance notch to the forward section of the slide rail. In certain embodiments, the ribs may each have a width greater than non-ribbed portions of the slide rail. In some embodiments, the aft section of the slide rail may be nonsegmented such that the aftmost wheel and the second-to-aftmost wheel are both rotatably coupled to a single, monolithic and integral component. In certain embodiments, the clearance notch may be defined on an underside of the slide rail. In some embodiments, the aftmost wheel station and the second-to-aftmost wheel station may have static positions relative to one another and the aftmost wheel may be longitudinally adjustable along the aftmost wheel station.

In certain embodiments, the aftmost wheel station may be nonpivotable relative to the second-to-aftmost wheel station. In some embodiments, the aftmost wheel station may have a higher elevation than the second-to-aftmost wheel station. In certain embodiments, the aftmost wheel station may have a vertically static position relative to the second-to-aftmost wheel station. In some embodiments, the second-to-aftmost wheel station may be proximate a forward end of the clearance notch. In certain embodiments, the clearance notch may be defined by a forward curved profile portion and an aft flat profile portion of the slide rail. In other embodiments, the forward curved profile portion may have a length $L_c$ in the longitudinal direction of the slide rail and the aft flat profile portion may have a length $L_s$ in the longitudinal direction of the slide rail such that $L_c \geq L_s$. In some embodiments, the flat profile portion of the slide rail that defines the clearance notch may be wider than the curved profile portion of the slide rail that defines the clearance notch. In certain embodiments, the clearance notch may be defined by a forward concave profile portion of the slide rail. In some embodiments, the gap formed between the drive track and the slide rail may have a maximum distance in a range between 20 millimeters and 60 millimeters. In certain embodiments, the drive track may be free floating at the path of travel.

In a second aspect, the present disclosure is directed to a snowmobile including a chassis and a drive track system coupled to the chassis. The drive track system includes a slide rail having a forward section and an aft section. The aft section of the slide rail has a monolithic construction and defines an aftmost wheel station, a second-to-aftmost wheel station forward of the aftmost wheel station and a clearance notch at least partially disposed between the aftmost wheel station and the second-to-aftmost wheel station in a longitudinal direction of the slide rail. An aftmost wheel is rotatably coupled to the slide rail at the aftmost wheel station. A second-to-aftmost wheel is rotatably coupled to the slide rail at the second-to-aftmost wheel station. A drive track has a path of travel between the aftmost wheel and the second-to-aftmost wheel such that the drive track and the slide rail form a gap therebetween at the path of travel.

In some embodiments, the drive track system may include an internal suspension assembly including one or more shock absorbers coupled to the slide rail and configured to absorb shocks experienced by the slide rail. In other embodiments, the drive track system may include an internal suspension assembly including an aft suspension arm having a lower end and an aft suspension arm mount, the lower end of the aft suspension arm coupled to the slide rail via the aft suspension arm mount. In such embodiments, the second-to-aftmost wheel station may be aft of the aft suspension arm and the aft suspension arm mount. In certain embodiments, the drive track system may include an axle coupled to the aftmost wheel and a tensioning mechanism coupled to the slide rail configured to adjust a longitudinal position of the axle within the aftmost wheel station, thereby adjusting a tension of the drive track. In some embodiments, the aftmost wheel may have an adjustable longitudinal position relative to the second-to-aftmost wheel using the tensioning mechanism, and the tensioning mechanism may include a tensioning bolt. In certain embodiments, the drive track may lift from the ground as the drive track moves along the path of travel from the second-to-aftmost wheel to the aftmost wheel. In some embodiments, a lift angle may be defined between a ground surface and a tangent of the aftmost wheel and the second-to-aftmost wheel. In such embodiments, the lift angle may be adjustable.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
FIGS. 1A-1C are schematic illustrations of a snowmobile having notched slide rails in accordance with embodiments of the present disclosure.
Figure 1B:
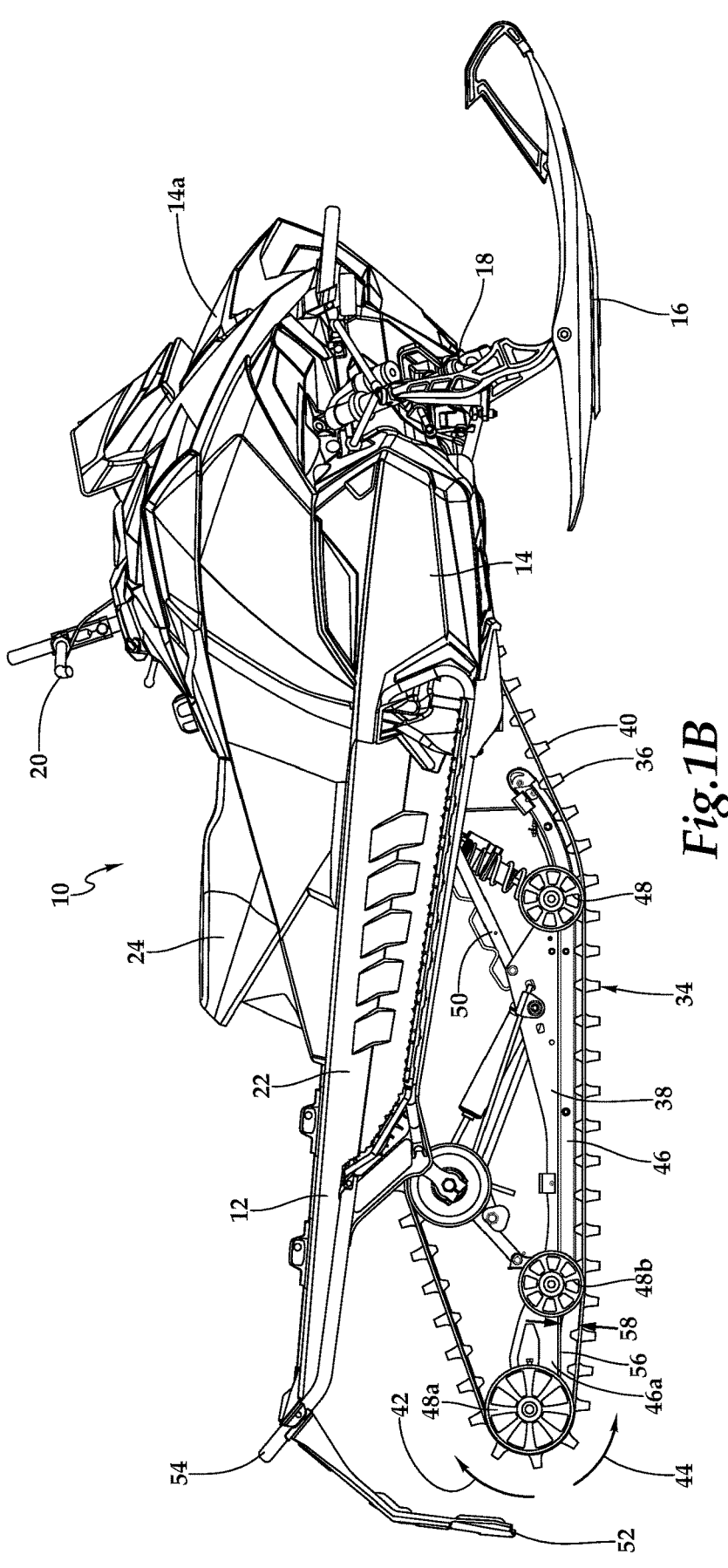
Figure 1C:
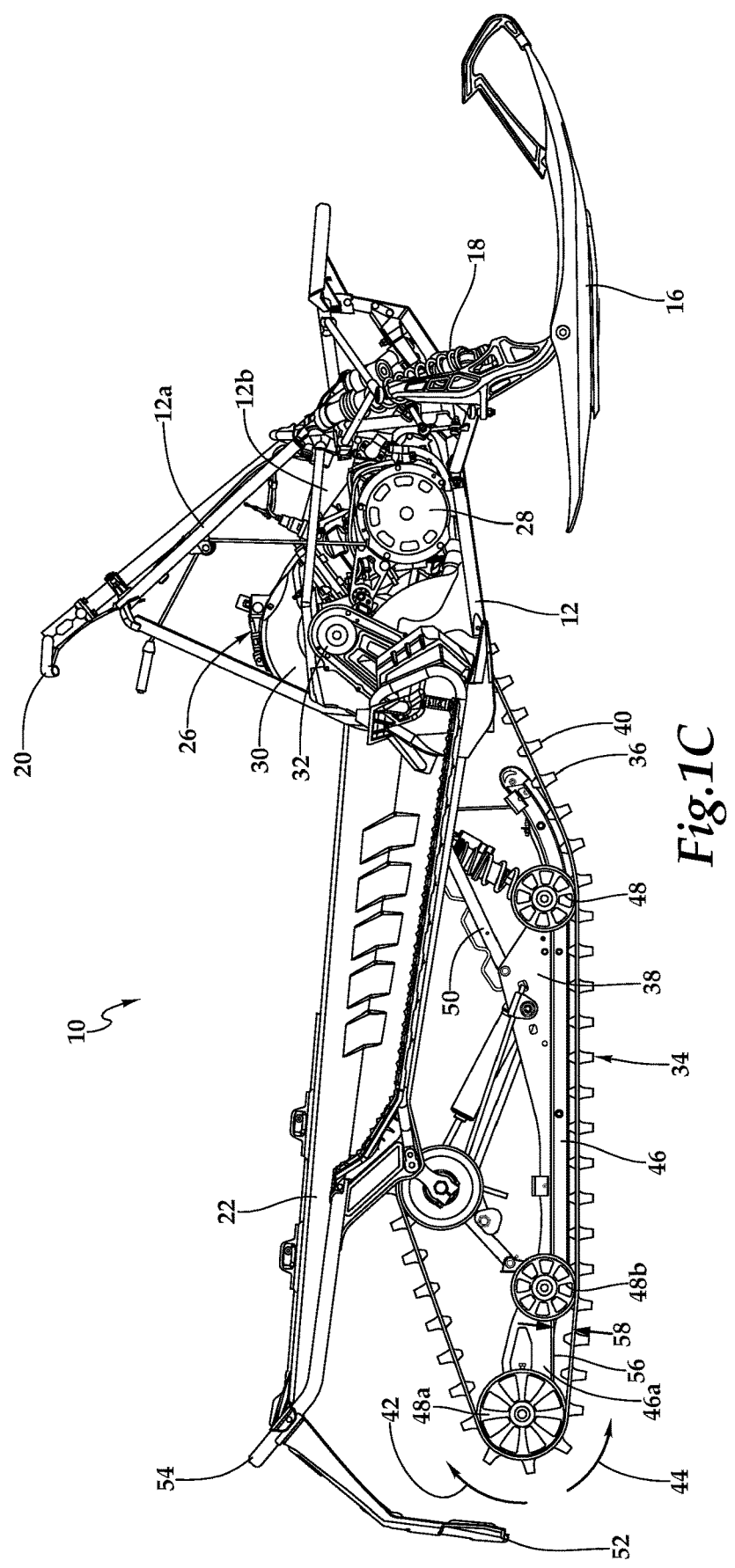

Referring to FIGS. 1A-1C in the drawings, a land vehicle depicted as a snowmobile is schematically illustrated and generally designated 10. Structural support for snowmobile 10 is provided by chassis 12, on or around which the various components of snowmobile 10 are assembled. Chassis 12 includes a forward frame assembly 12a formed from interconnected tube members. One or more shrouds 14 cover and protect the various components of snowmobile 10 including parts of chassis 12. For example, front shroud 14a shields underlying componentry from snow and shields the operator of snowmobile 10 from oncoming terrain and cold air during operation. Shrouds 14 have been removed in FIG. 1C to illustrate underlying components of snowmobile 10. Skis 16 and a front suspension assembly 18 provide front end support for snowmobile 10. Skis 16 are interconnected to handlebar 20, which are used by an operator to steer snowmobile 10 in a leftward or rightward direction. When handlebar 20 is rotated, skis 16 responsively pivot to turn snowmobile 10. A tunnel 22 is part of chassis 12 and extends in an aft direction from forward frame assembly 12a. The operator controls snowmobile 10 from a seat 24 atop tunnel 22 and behind handlebar 20.

A powertrain 26 including a prime mover 28, a continuously variable transmission 30 and a belt drive assembly 32 is coupled to chassis 12. Prime mover 28 may reside in a bay 12b formed within forward frame assembly 12a of chassis 12. While prime mover 28 is depicted as an engine such as a two-stroke engine or a four-stroke engine, in other embodiments prime mover 28 may be an electric motor. In embodiments in which prime mover 28 is an engine, the engine may be naturally aspirated or include a power adder such as a belt-driven or gear-driven supercharger or a turbocharger. The engine may be fuel injected or include a carburetor. Transmission types other than a continuously variable transmission may alternatively be used to control the rotational energy provided by powertrain 26. In some implementations including embodiments in which prime mover 28 is an electric motor, rotational energy may be generated by powertrain 26 without the need for a transmission or gearbox.

A drive track system 34 partially disposed within tunnel 22 is in contact with the ground to provide ground propulsion for snowmobile 10. Drive track system 34 includes a drive track 36 supported by a track frame 38. Drive track 36 includes cleats 40 for additional traction on soft or snowy surfaces. Drive track 36 rotates around track frame 38 in either direction 42 to propel snowmobile 10 forward in a forward mode or direction 44 to propel snowmobile 10 backward in a reverse mode. Track frame 38 may be coupled to chassis 12 via a swing arm having a coil spring, a rigid strut, a torsion spring, an elastomeric member or any other suitable coupling configuration. Powertrain 26 provides rotational energy to rotate drive track 36 around track frame 38. Track frame 38 includes a pair of laterally-spaced slide rails 46 to maintain a portion of drive track 36 in contact with the ground. In other embodiments, track frame 38 may include only a single slide rail or more than two slide rails. The undersides of slide rails 46 may include low-friction wear strips in contact with the inside of drive track 36 to facilitate the movement of drive track 36 between slide rails 46 and the ground. Idler wheels 48 are rotatably coupled to slide rails 46 and guide the movement of drive track 36 around track frame 38 at bends and other locations along the path of travel of drive track 36. Slide rails 46 are coupled to tunnel 22 via an internal suspension assembly 50 including shock absorbers to absorb sudden movements or shocks felt by slide rails 46 and thereby enhance the comfort of an operator riding snowmobile 10. A rear flap 52 deflects snow emitted by drive track 36. A lift handle 54 may be used to lift the aft end of snowmobile 10.

The surface area of drive track system 34 that contacts the ground is determined in part by the length of slide rails 46, with longer slide rails providing a larger surface area. For off-trail riding, a large ground contact surface area helps to provide floatation and traction for snowmobile 10 over soft or snowy surfaces. On the other hand, a smaller ground contact surface area facilitates turning, handling and maneuverability on, for example, tight or winding snow trails. Selecting a slide rail length involves a trade-off between these two competing benefits. In order to increase ground contact surface area, current snowmobiles often utilize flat slide rails that provide no ground clearance at the aft end of the drive track system. Because the slide rails are flat, the drive track is in sliding contact with the aft ends of the slide rails. Snowmobiles using long and flat slide rails fail to reap the aforementioned maneuverability benefits on hard snow or trail surfaces. In addition, when the snowmobile is driven in reverse, particularly on soft snow, the lack of ground clearance at the aft ends of such drive track systems can cause the drive track to dig into the snow, which may result in the snowmobile becoming immobilized. Other types of snowmobiles utilize slide rails coupled to articulating, or pivotable, aft arms to vary the downward force exerted on the drive track at the aft end of the drive track system. Such articulating systems, however, are complex and require numerous additional moving components, making such systems more costly, unreliable and difficult to manufacture.

To address these and other drawbacks of current drive track systems, aft sections 46a of slide rails 46 have a monolithic construction to avoid the unreliability, complexity and cost issues of articulating slide rails. In addition, aft sections 46a of slide rails 46 include clearance notches 56 defined on the underside thereof. Aftmost wheels 48a are rotatably coupled to aft sections 46a of slide rails 46 above the aft ends of clearance notches 56. Second-to-aftmost wheels 48b are rotatably coupled to aft sections 46a of slide rails 46 proximate the forward ends of clearance notches 56.

Thus, clearance notches 56 may be fully or partially between aftmost wheels 48a and second-to-aftmost wheels 48b in the longitudinal direction of slide rails 46. Gaps 58 are formed between drive track 36 and aft sections 46a of slide rails 46 at clearance notches 56 as drive track 36 moves from second-to-aftmost wheels 48b to aftmost wheels 48a in the forward mode or from aftmost wheels 48a to second-to-aftmost wheels 48b in the reverse mode. Since aftmost wheels 48a have a higher elevation than second-to-aftmost wheels 48b, drive track 36 gradually lifts off the ground at an angle as drive track 36 moves from second-to-aftmost wheels 48b to aftmost wheels 48a in the forward mode and gradually moves toward the ground at an angle as drive track 36 moves from aftmost wheels 48a to second-to-aftmost wheels 48b in the reverse mode, thus providing ground clearance at the aft end of drive track system 34. With the inclusion of clearance notches 56 between aftmost wheels 48a and second-to-aftmost wheels 48b, slide rails 46 provide the floatation and traction advantages of longer slide rails over the soft or snowy surfaces often encountered in off-trail riding while providing the turning, handling and maneuverability advantages of shorter slide rails, which are often useful for on-trail riding or snowmobile racing. Snowmobile 10, while benefiting from the extended length of drive track system 34, has the handling feel of a shorter drive track system. Thus, snowmobile 10 is more easily able to cross over between on-trail and off-trail snow riding for a more versatile riding experience. In addition, drive track system 34 has a favorable approach angle when snowmobile 10 is traveling in reverse to ride over snow and other obstacles, which prevents snowmobile 10 from being immobilized in the reverse mode.

It should be appreciated that snowmobile 10 is merely illustrative of a variety of vehicles that can implement the embodiments disclosed herein. Indeed, drive track system 34 including slide rails 46 may be implemented on any ground-based vehicle that uses a drive track. Other vehicle implementations can include all-terrain vehicles (ATVs), utility vehicles, military vehicles including tanks, recreational vehicles, straddle-type vehicles and the like. As such, those skilled in the art will recognize that drive track system 34 including slide rails 46 can be integrated into a variety of vehicle configurations. It should be appreciated that even though ground-based vehicles are particularly well-suited to implement the embodiments of the present disclosure, hybrid ground-airborne vehicles and devices such as some aircraft can also implement the embodiments.

Figure 2A:
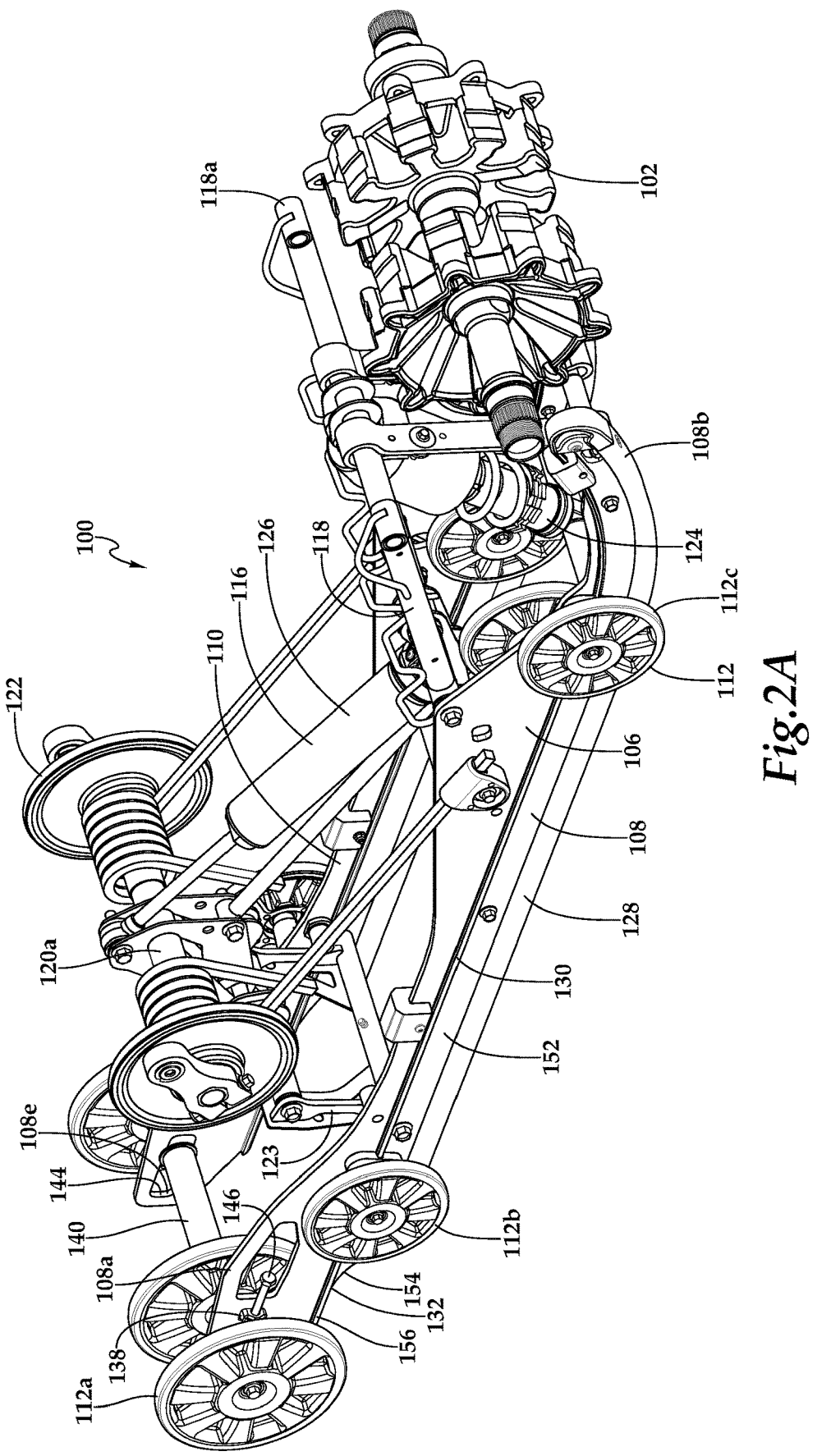
FIGS. 2A-2C are various views of a snowmobile drive track system having notched slide rails in accordance with embodiments of the present disclosure.
Figure 2B:
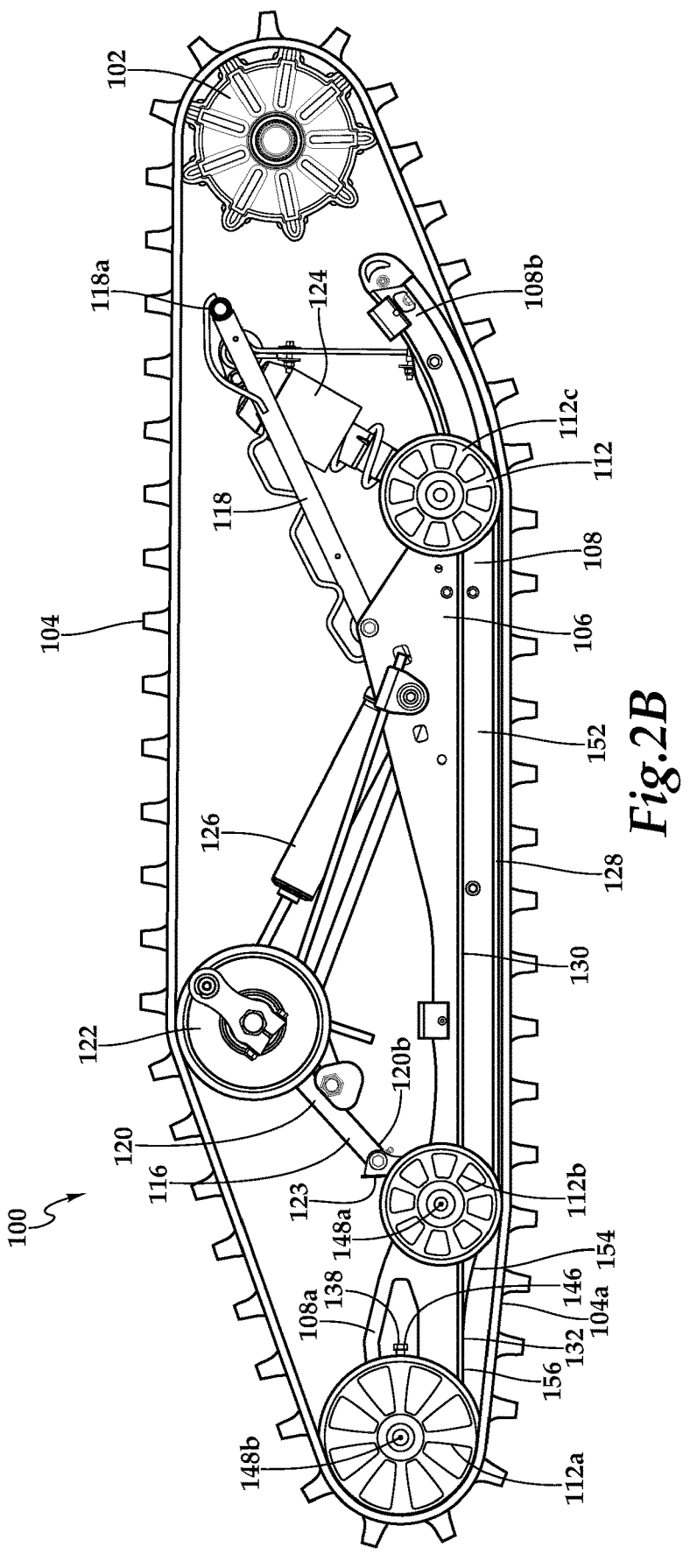
Figure 2C:
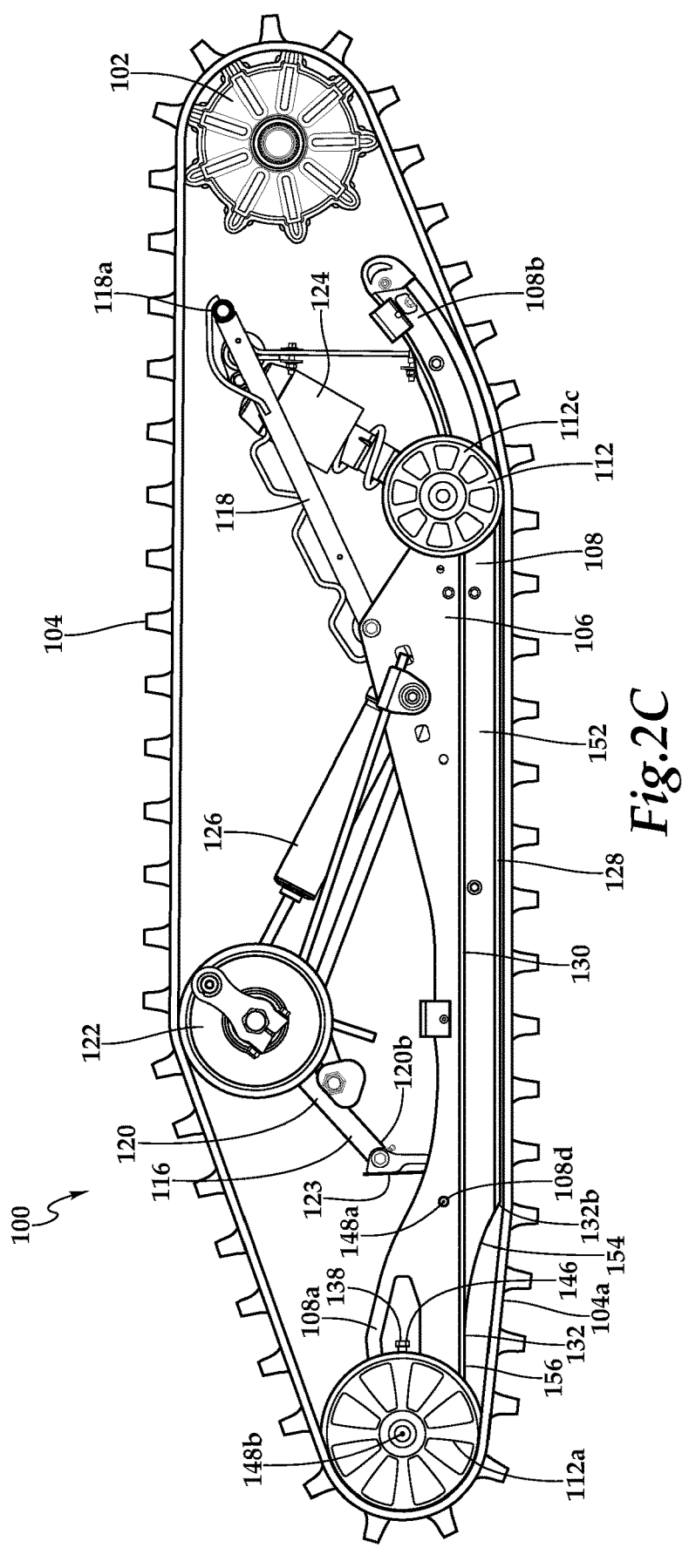

Referring to FIGS. 2A-2C in the drawings, a drive track system for a snowmobile is schematically illustrated and generally designated 100. Drive track engagement sprockets 102 are part of the powertrain of the snowmobile and receive rotational energy from a prime mover such as prime mover 28 in FIG. 1C to rotate drive track 104 around track frame 106 in either direction. Track frame 106 includes a pair of laterally-spaced slide rails 108, 110 to maintain a portion of drive track 104 in contact with the ground. Idler wheels 112 are rotatably coupled to slide rails 108, 110 to guide the movement of drive track 104 around track frame 106 at bends and other locations along drive track 104. Internal suspension assembly 116 absorbs sudden movements or shocks experienced by slide rails 108, 110. Internal suspension assembly 116 includes a front suspension arm 118 and an aft suspension arm 120 having upper and lower ends 120a, 120b. Upper end 118a of front suspension arm 118 may be pivotally coupled to the tunnel of the snowmobile such as tunnel 22 in FIGS. 1A-1C. Upper end 120a of aft suspension arm 120 may be rotatably coupled to upper idler wheels 122, which guide drive track 104 over suspension arms 118, 120 and may also maintain tension in drive track 104 in response to compression of internal suspension assembly 116. Lower end 120b of aft suspension arm 120 is pivotably coupled to slide rails 108, 110 via aft suspension arm mounts 123. Front suspension arm 118 is additionally coupled to slide rails 108, 110 via front shock absorber 124, which resists the rotation of front suspension arm 118. Aft suspension arm 120 is additionally coupled to slide rails 108, 110 via aft shock absorber 126, which resists the rotation of aft suspension arm 120. In certain embodiments, shock absorbers 124, 126 bias slide rails 108, 110 downward against drive track 104 to ensure proper contact therebetween. Suspension arms 118, 120 may be assemblies that include brackets, rocker arms or other components to provide attachments to the various components of drive track system 100. While internal suspension assembly 116 is illustrated as having two suspension arms 118, 120 and two shock absorbers 124, 126, internal suspension assembly 116 may have any number of such components in other configurations.

Slide rail 108 is substantially similar to slide rail 110 therefore, for sake of efficiency, certain features will be disclosed only with regard to slide rail 108. One having ordinary skill in the art, however, will fully appreciate an understanding of slide rail 110 based upon the disclosure herein of slide rail 108. Slide rail 108 has aft section 108a and forward section 108b. The forward end of forward section 108b upwardly curves to provide drive track system 100 with a favorable approach angle in the forward mode. Idler wheels 112 include aftmost wheel 112a, second-to-aftmost wheel 112b and front wheel 112c. Second-to-aftmost wheel 112b has been removed in FIG. 2C to show underlying components. The underside of slide rail 108 between second-to-aftmost wheel 112b and front wheel 112c is substantially flat and may include a low-friction wear strip 128 to facilitate the movement of drive track 104 between slide rail 108 and the ground. Slide rail 108 includes an upper rib 130 that extends longitudinally through aft and forward sections 108a, 108b of slide rail 108 to provide structural reinforcement thereto. Slide rail 108 may be formed from aluminum, steel or any other material with suitable strength and weight characteristics.

Referring additionally to FIGS. 3A-3D in the drawings, aft section 108a of slide rail 108 defines aftmost wheel station 108c and second-to-aftmost wheel station 108d forward of aftmost wheel station 108c. As best seen in FIG. 2C, second-to-aftmost wheel station 108d is aft of both aft suspension arm 120 and aft suspension arm mount 123. Aftmost wheel 112a is rotatably coupled to slide rail 108 at aftmost wheel station 108c and second-to-aftmost wheel 112b is rotatably coupled to slide rail 108 at second-to-aftmost wheel station 108d. Aft section 108a of slide rail 108 is nonsegmented such that aftmost wheel 112a and second-to-aftmost wheel 112b are both rotatably coupled to the same single, monolithic and integral component. Thus, aftmost wheel station 108c is nonpivotable relative to second-to-aftmost wheel station 108d. Because aftmost wheel station 108c does not pivot, aftmost wheel 112a has a vertically static position relative to second-to-aftmost wheel 112b and aftmost wheel station 108c has a vertically static position relative to second-to-aftmost wheel station 108d. The singular and monolithic construction of slide rail 108 is more reliable and cost-effective than previous slide rails having articulating aft ends or segments. Aftmost wheel station 108c has a higher vertical elevation than second-to-aftmost wheel station 108d. In the illustrated embodiment, aftmost wheel 112a is larger and has a higher vertical elevation than second-to-aftmost wheel 112b, although in other embodiments aftmost wheel 112a may be the same size or smaller than second-to-aftmost wheel 112b.

Aft section 108a of slide rail 108 defines clearance notch 132 disposed at least partially between aftmost wheel station 108c and second-to-aftmost wheel station 108d on the underside of slide rail 108. In some embodiments, clearance notch 132 may be machined from slide rail 108, although clearance notch 132 may be formed using numerous manufacturing techniques. In the illustrated embodiment, aftmost wheel station 108c is directly above aft end 132a of clearance notch 132, although in other embodiments aftmost wheel station 108c may be located forward and above or aft and above aft end 132a of clearance notch 132. Aftmost wheel 112a may be vertically elevated any distance 134 from ground 136. For example, distance 134 may be in a range between 12.7 millimeters to 127 millimeters such as 25.4 millimeters or 37.87 millimeters depending on a number of factors such as the size of aftmost wheel 112a and/or the dimensions of clearance notch 132. Vertical distance 135a between aft end 132a of clearance notch 132 and ground 136 may be less than longitudinal distance 135b between aft end 132a of clearance notch 132 and forward end 132b of clearance notch 132. The ratio between vertical distance 135a and longitudinal distance 135b may vary, non-limiting examples of which include 10:1, 9:1, 8:1, 7:1, 6:1, 5:1, 4:1, 3:1, 2:1 or 1:1 including ratios therebetween. Second-to-aftmost wheel 112b helps to prevent forward end 132b of clearance notch 132 from digging into or damaging drive track 104 as drive track 104 moves past forward end 132b of clearance notch 132 and generally helps to improve ride quality by acting as a transition from the underside of slide rail 108 to aftmost wheel 112a.

While aftmost wheel station 108c and second-to-aftmost wheel station 108d have static positions relative to one another, aftmost wheel 112a is longitudinally adjustable relative to second-to-aftmost wheel 112b using tensioning mechanism 138, which is coupled to slide rail 108. As best seen in FIG. 2A, aftmost wheel 112a as well as its counterpart on slide rail 110 are coupled to the outboard ends of an axle 140. Aftmost wheel stations 108c, 108e of slide rails 108, 110 act as tensioning slots 142, 144, respectively, through which axle 140 extends. Each tensioning mechanism 138 includes a tensioning bolt 146 that is rotatable to adjust the longitudinal position of axle 140 along and within aftmost wheel stations 108c, 108e, which allows the tension of drive track 104 to be adjusted. Using tensioning mechanism 138, aftmost wheel 112a has an adjustable longitudinal position relative to second-to-aftmost wheel 112b. Second-to-aftmost wheel station 108d is proximate forward end 132b of clearance notch 132. In the illustrated embodiment, second-to-aftmost wheel station 108d is directly above forward end 132b of clearance notch 132, although in other embodiments second-to-aftmost wheel station 108d may be located forward and above or aft and above forward end 132b of clearance notch 132. In some embodiments, second-to-aftmost wheel 112b has an axis of rotation 148a in the center of second-to-aftmost wheel station 108d such that both axis of rotation 148a of second-to-aftmost wheel 112b and second-to-aftmost wheel station 108d are aft of aft suspension arm 120 and aft suspension arm mount 123 and generally interposed between forward end 132b of clearance notch 132 and aft suspension arm mount 123. In some embodiments, second-to-aftmost wheel station 108d and forward end 132b of clearance notch 132 are located as close as possible to the aft side of aft suspension arm mount 123 without interfering with the structural strength of the coupling between aft suspension arm mount 123 and slide rail 108. Aftmost wheel 112*a* has an axis of rotation 148*b*. Longitudinal distance 149 between axis of rotation 148*a* of second-to-aftmost wheel 112*b* and axis of rotation 148*b* of aftmost wheel 112*a* may vary depending on the position of aftmost wheel 112*a* along aftmost wheel station 108*c*. Furthermore, the ratio between longitudinal distance 149 between axes of rotation 148*a*, 148*b* and distance 134 at which aftmost wheel 112*a* is elevated from ground 136 may vary, non-limiting examples of which include 10:1, 9:1, 8:1, 7:1, 6:1, 5:1, 4:1, 3:1, 2:1 or 1:1 including ratios therebetween such as 7.24:1.

Figure 3A:
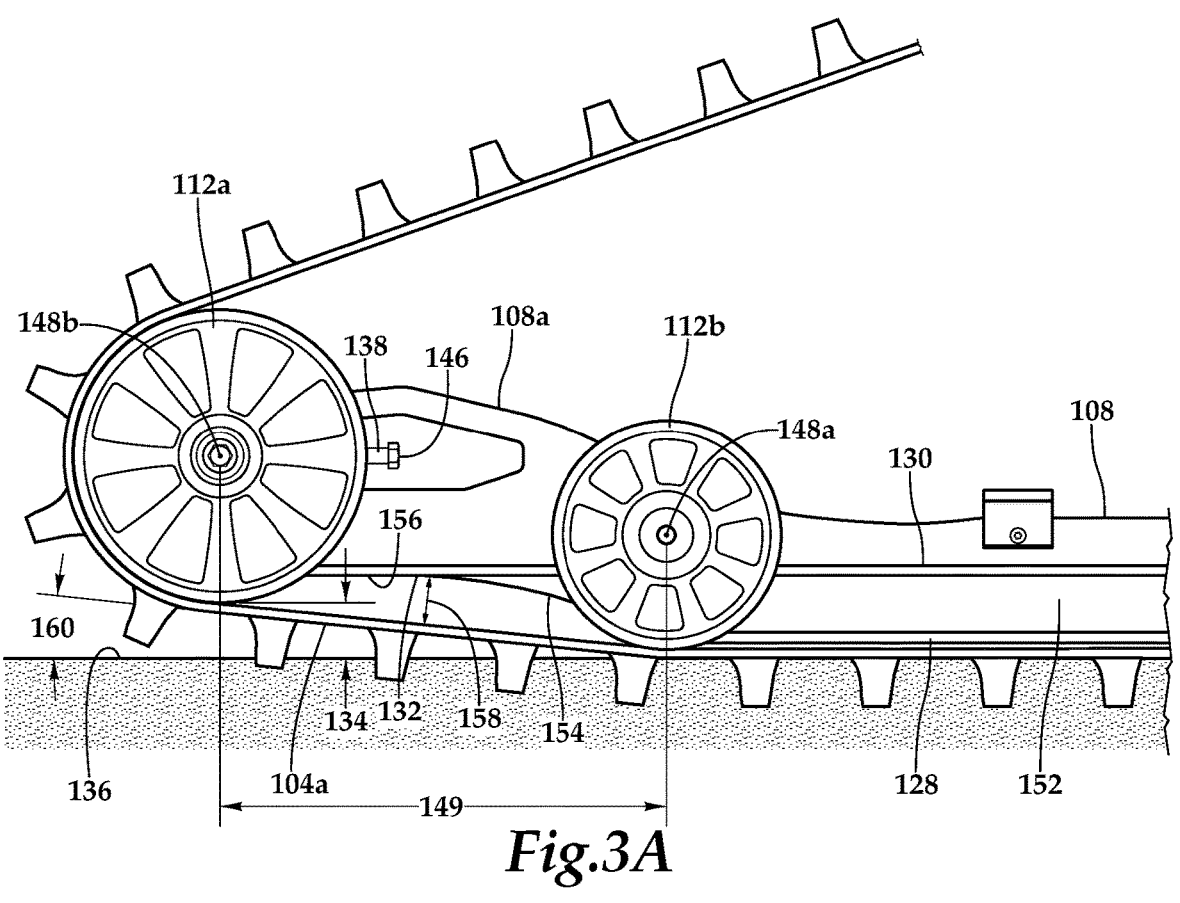
FIGS. 3A-3D are various views of a notched slide rail for a snowmobile drive track system in accordance with embodiments of the present disclosure.
Figure 3B:
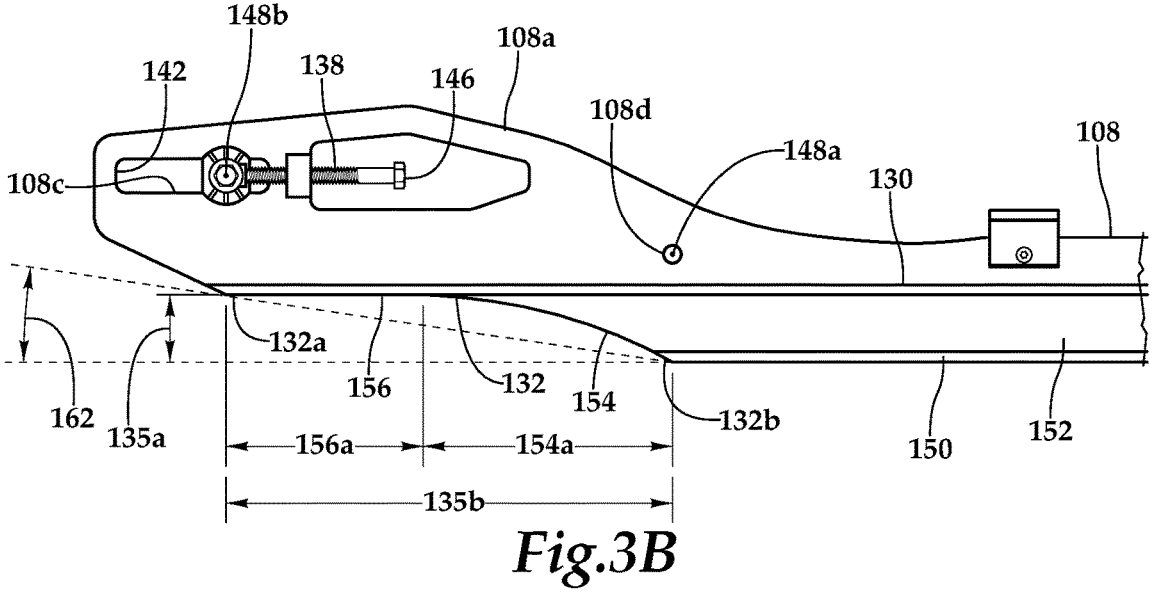
Figure 3C:
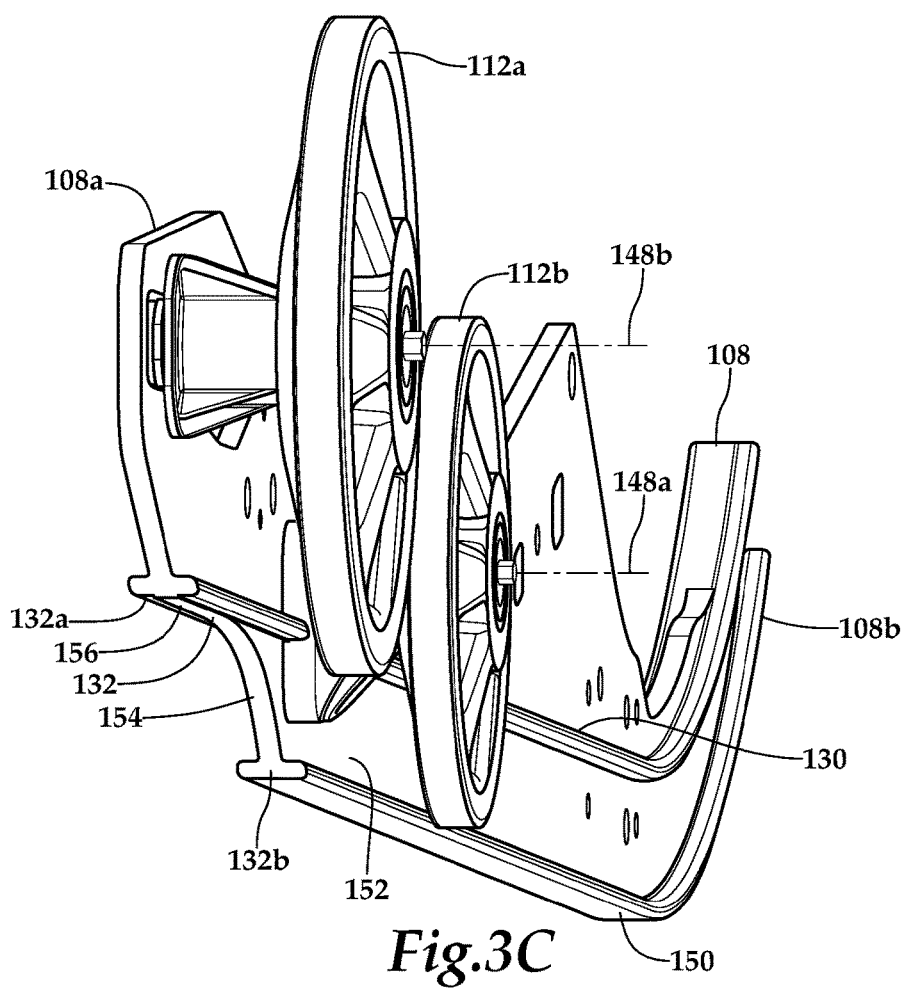
Figure 3D:
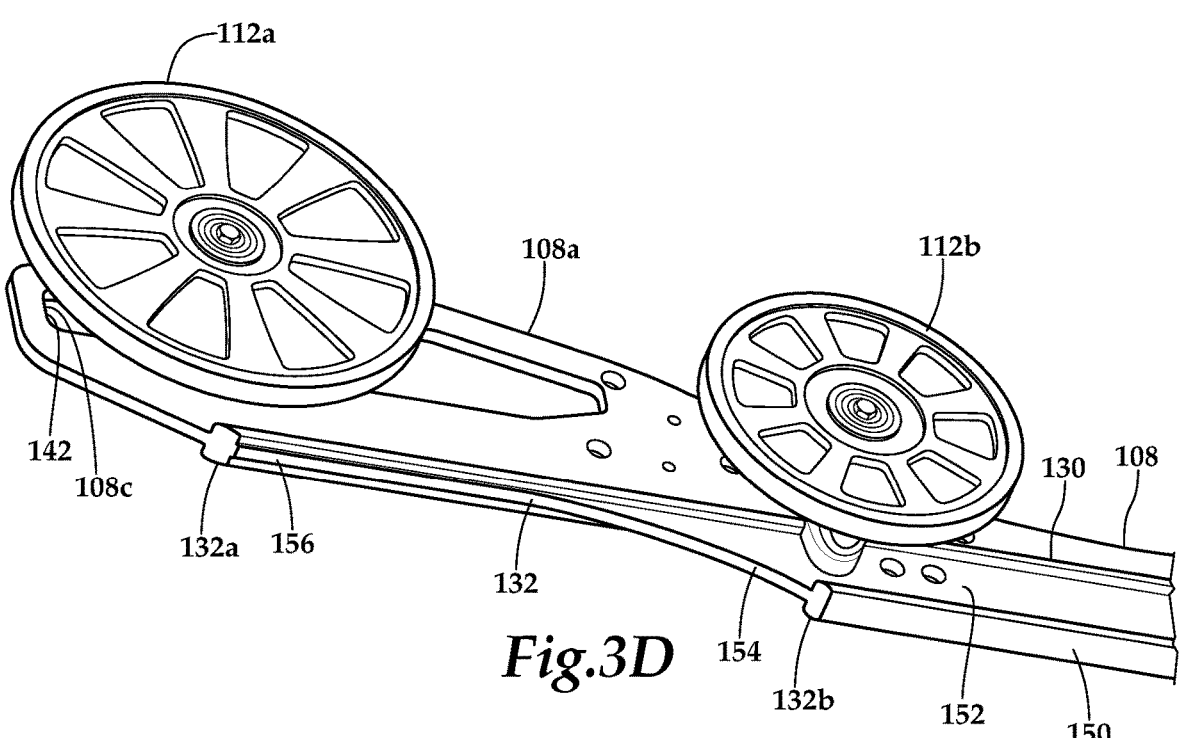

The underside of slide rail 108 includes a lower rib 150 to provide structural strength to slide rail 108 and also to receive wear strip 128. As best seen in FIG. 3C, the width of upper and lower ribs 130, 150 is greater than the width of non-ribbed portions 152 of slide rail 108. Upper and lower ribs 130, 150 may have uniform or nonuniform widths. Lower rib 150 extends forward from forward end 132*b* of clearance notch 132 and extends through forward section 108*b* of slide rail 108. Upper rib 130 defines an aft portion of clearance notch 132 having a flat profile such that clearance notch 132 upwardly terminates at upper rib 130, thus allowing upper rib 130 to extend through aft section 108*a* of slide rail 108 and provide structural support thereto. Clearance notch 132 is partially defined by a forward curved profile portion 154 of slide rail 108. In the illustrated embodiment, curved profile portion 154 of slide rail 108 is concave in shape, although in other embodiments curved profile portion 154 of slide rail 108 may instead form a straight angled edge or other curved shapes. Curved profile portion 154 has a length 154*a* in the longitudinal direction of slide rail 108. Clearance notch 132 is also partially defined by an aft flat profile portion 156 of slide rail 108, which is bounded by upper rib 130. Flat profile portion 156 has a length 156*a* in the longitudinal direction of slide rail 108. In the illustrated embodiment, length 154*a* of curved profile portion 154 is greater than length 156*a* of flat profile portion 156. In other embodiments, length 154*a* of curved profile portion 154 may be equal to or less than length 156*a* of flat profile portion 156. In embodiments in which length 154*a* of curved profile portion 154 is equal to length 156*a* of flat profile portion 156, length 154*a* and length 156*a* have a 1:1 ratio. Other example ratios between length 154*a* and length 156*a* include 1.25:1, 1.5:1, 1.75:1, 2:1, 2.5:1, 3:1, 4:1, 5:1, 1:5, 1:4, 1:3, 1:2.5, 1:2, 1:1.75, 1:1.5 or 1:1.25 including ratios therebetween. In one non-limiting example, length 154*a* of curved profile portion 154 may be in a range between 80 millimeters and 200 millimeters such as approximately 140 millimeters and length 156*a* of flat profile portion 156 may be in a range between 50 millimeters and 170 millimeters such as approximately 113 millimeters. As best seen in FIG. 3C, flat profile portion 156 of slide rail 108 that defines clearance notch 132 is wider than curved profile portion 154 of slide rail 108 that defines clearance notch 132 for enhanced strength.

Due to the presence of clearance notch 132 as defined by slide rail 108, drive track 104 and slide rail 108 form a gap 158 therebetween at drive track path of travel 104*a* between aftmost wheel 112*a* and second-to-aftmost wheel 112*b*. The size of gap 158 varies from forward end 132*b* to aft end 132*a* of clearance notch 132. In some embodiments, gap 158 has a maximum distance in a range between 20 millimeters and 60 millimeters such as 40 millimeters. Gap 158 may be proportional to the size or shape of clearance notch 132. Gap 158 created by clearance notch 132 substantially prevents contact between drive track 104 and slide rail 108 such that drive track 104 free floats at drive track path of travel 104*a* between aftmost wheel 112*a* and second-to-aftmost wheel 112*b*.

As drive track 104 moves along drive track path of travel 104*a* from second-to-aftmost wheel 112*b* to aftmost wheel 112*a* in the forward mode, drive track 104 lifts from ground 136 at a lift angle 160, which is defined as the angle between ground 136 and a tangent of aftmost wheel 112*a* and second-to-aftmost wheel 112*b*. Lift angle 160 may be selected to be any suitable angle taking into consideration a number of factors such as the desired floatation, maneuverability and/or reverse mode approach angle of the snowmobile. For example, for enhanced turning, handling and maneuverability on snow trails or racetracks, a larger lift angle 160 may be selected to decrease the surface area of contact between drive track system 100 and ground 136. A larger lift angle 160 may also provide a more favorable approach angle for the snowmobile in the reverse mode to ride over snow or obstacles. Conversely, for enhanced floatation and traction on soft, snowy and/or off-trail terrain, a smaller lift angle 160 may be selected to increase the surface area of contact between drive track system 100 and ground 136. Lift angle 160 may also be selected to compromise between the aforementioned advantages of large and small ground surface areas of contact so that the snowmobile has a desired degree of versatility for both on-trail and off-trail riding. Lift angle 160 may be varied by adjusting the longitudinal position of aftmost wheel 112*a* along aftmost wheel station 108*c*. For example, lift angle 160 may be in a range between 2 degrees and 11 degrees such as a range between 5 degrees and 8 degrees. In this example, lift angle 160 may be increased by moving aftmost wheel 112*a* forward along aftmost wheel station 108*c* and decreased by moving aftmost wheel 112*a* aftward along aftmost wheel station 108*c*. Lift angle 160 may alternatively or additionally be varied by changing the size of aftmost wheel 112*a*, with a larger aftmost wheel 112*a* decreasing lift angle 160 and a smaller aftmost wheel 112*a* increasing lift angle 160. In one non-limiting and specific example, lift angle 160 may be approximately 5.14 degrees when aftmost wheel 112*a* has a 7.12 inch diameter and is slid into the aftmost position of aftmost wheel station 108*c*. In another non-limiting and specific example, lift angle 160 may be approximately 8 degrees when aftmost wheel 112*a* has a 6.38 inch diameter and is slid into the forwardmost position of aftmost wheel station 108*c*. As best seen in FIG. 3B, a notch angle 162 is defined between ground 136 and a line connecting aft end 132*a* and forward end 132*b* of clearance notch 132. Notch angle 162 may be in a range between 2 degrees and 11 degrees such as a range between 5 degrees and 8 degrees, and varies based on the distance between ground 136 and aft end 132*a* of clearance notch 132. Therefore, clearance notches of different dimensions may have different notch angles.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/ or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A drive track system for a snowmobile, the drive track system comprising:
   a slide rail having a forward section and an aft section, the aft section of the slide rail having a monolithic construction and defining an aftmost wheel station, a second-to-aftmost wheel station forward of the aftmost wheel station and a clearance notch at least partially disposed between the aftmost wheel station and the second-to-aftmost wheel station in a longitudinal direction of the slide rail;
   an aftmost wheel rotatably coupled to the slide rail at the aftmost wheel station;
   a second-to-aftmost wheel rotatably coupled to the slide rail at the second-to-aftmost wheel station; and
   a drive track having a path of travel between the aftmost wheel and the second-to-aftmost wheel, the drive track and the slide rail forming a gap therebetween at the path of travel.

2. The drive track system as recited in claim 1 wherein the slide rail comprises upper and lower ribs, the upper rib extending longitudinally through the forward and aft sections of the slide rail and defining at least a portion of the clearance notch having a flat profile, the lower rib extending from a forward end of the clearance notch to the forward section of the slide rail.

3. The drive track system as recited in claim 2 wherein the ribs each have a width greater than non-ribbed portions of the slide rail.

4. The drive track system as recited in claim 1 wherein the aft section of the slide rail is nonsegmented such that the aftmost wheel and the second-to-aftmost wheel are both rotatably coupled to a single, monolithic and integral component.

5. The drive track system as recited in claim 1 wherein the clearance notch is defined on an underside of the slide rail.

6. The drive track system as recited in claim 1 wherein the aftmost wheel station and the second-to-aftmost wheel station have static positions relative to one another and wherein the aftmost wheel is longitudinally adjustable along the aftmost wheel station.

7. The drive track system as recited in claim 1 wherein the aftmost wheel station is nonpivotable relative to the second-to-aftmost wheel station.

8. The drive track system as recited in claim 1 wherein the aftmost wheel station has a higher elevation than the second-to-aftmost wheel station.

9. The drive track system as recited in claim 1 wherein the aftmost wheel station has a vertically static position relative to the second-to-aftmost wheel station.

10. The drive track system as recited in claim 1 wherein the second-to-aftmost wheel station is proximate a forward end of the clearance notch.

11. The drive track system as recited in claim 1 wherein the clearance notch is defined by a forward curved profile portion and an aft flat profile portion of the slide rail.

12. The drive track system as recited in claim 11 wherein the forward curved profile portion has a length $L_c$ in the longitudinal direction of the slide rail and the aft flat profile portion has a length $L_s$ in the longitudinal direction of the slide rail; and
   wherein, $L_c \geq L_s$.

13. The drive track system as recited in claim 11 wherein the flat profile portion of the slide rail that defines the clearance notch is wider than the curved profile portion of the slide rail that defines the clearance notch.

14. The drive track system as recited in claim 1 wherein the clearance notch is defined by a forward concave profile portion of the slide rail.

15. The drive track system as recited in claim 1 wherein the gap formed between the drive track and the slide rail has a maximum distance in a range between 20 millimeters and 60 millimeters.

16. A snowmobile comprising:
   a chassis; and
   a drive track system coupled to the chassis, the drive track system comprising:
   a slide rail having a forward section and an aft section, the aft section of the slide rail having a monolithic construction and defining an aftmost wheel station, a second-to-aftmost wheel station forward of the aftmost wheel station and a clearance notch at least partially disposed between the aftmost wheel station and the second-to-aftmost wheel station in a longitudinal direction of the slide rail;
   an aftmost wheel rotatably coupled to the slide rail at the aftmost wheel station;
   a second-to-aftmost wheel rotatably coupled to the slide rail at the second-to-aftmost wheel station; and
   a drive track having a path of travel between the aftmost wheel and the second-to-aftmost wheel, the drive track and the slide rail forming a gap therebetween at the path of travel.

17. The snowmobile as recited in claim 16 wherein the drive track system further comprises an internal suspension assembly including an aft suspension arm having a lower end and an aft suspension arm mount, the lower end of the aft suspension arm coupled to the slide rail via the aft suspension arm mount; and
   wherein, the second-to-aftmost wheel station is aft of the aft suspension arm and the aft suspension arm mount.

18. The snowmobile as recited in claim 16 wherein the drive track system further comprises:
   an axle coupled to the aftmost wheel; and
   a tensioning mechanism coupled to the slide rail configured to adjust a longitudinal position of the axle within the aftmost wheel station, thereby adjusting a tension of the drive track.

19. The snowmobile as recited in claim 18 wherein the aftmost wheel has an adjustable longitudinal position relative to the second-to-aftmost wheel using the tensioning mechanism; and
   wherein, the tensioning mechanism comprises a tensioning bolt.

20. The snowmobile as recited in claim 16 wherein a lift angle is defined between a ground surface and a tangent of the aftmost wheel and the second-to-aftmost wheel, and wherein the lift angle is adjustable.

* * * * *